June 23, 1931.          J. GELOSO          1,811,465
TELEVISION DEVICE

Filed Dec. 24, 1928

INVENTOR
John Geloso
by David J. Mosoff
ATTORNEY

Patented June 23, 1931

1,811,465

UNITED STATES PATENT OFFICE

JOHN GELOSO, OF NEW YORK, N. Y., ASSIGNOR, BY MESNE ASSIGNMENTS, TO PILOT RADIO & TUBE CORPORATION, OF BROOKLYN, NEW YORK, A CORPORATION OF DELAWARE

TELEVISION DEVICE

Application filed December 24, 1928. Serial No. 328,076.

My invention relates to television apparatus, and more specifically to a speed drive for a scanning disc, employed in such apparatus.

It is an object of the present invention to provide a driving mechanism for scanning discs whereby the speeds of such discs may be easily and accurately controlled and the same rapidly brought to synchronization.

It is a further object of the present invention to provide a mechanism of the above indicated character, which is easily manipulated, is simple in construction and is inexpensive to manufacture.

My invention comprises broadly a driving mechanism in the form of an electric motor, having a friction element, upon its armature shaft, the friction element being adapted to engage a friction disc integral with or geared to the scanning disc. The motor is mounted upon a carriage which is movable parallel to the plane of the friction disc so that the friction element on the motor shaft will engage the friction disc at different distances from the center of such disc to vary the speed of the same.

Figure 1:
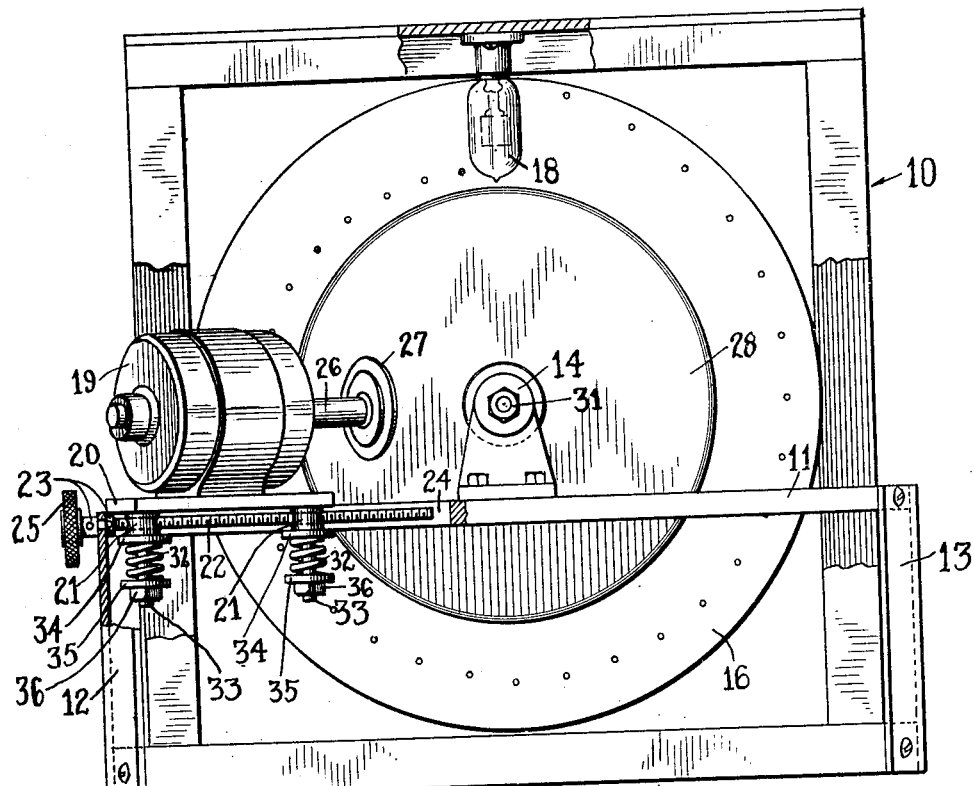
Figure 2:
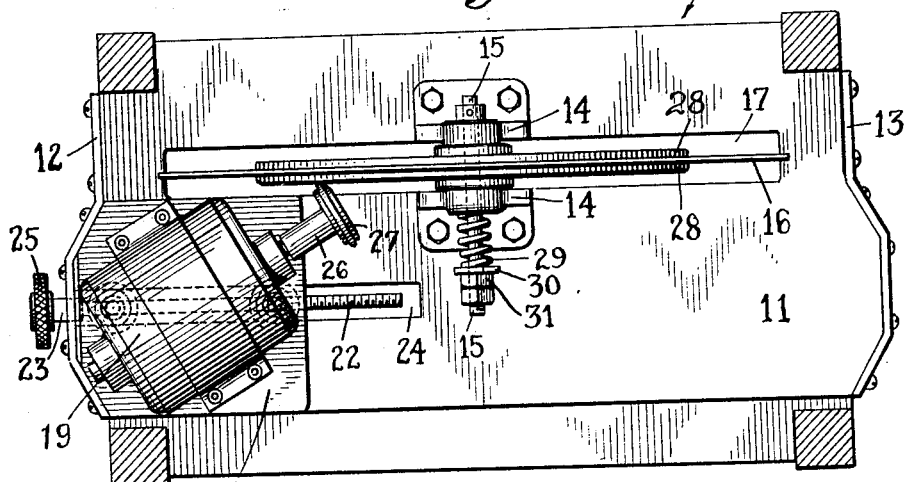

In the accompanying drawings which shows by way of example, a form of my invention without defining its limits, Figure 1, is a rear elevation partly broken away, and showing parts in section; and Figure 2, is a plan view of the apparatus.

Figure 1, shows a television receiving apparatus, comprising a casing or cabinet 10, of any suitable construction and having a horizontal plate 11, attached to the sides thereof and supported by uprights 12 and 13. Bearings 14 are fixed upon the plate 11 and are adapted to support a shaft 15, upon which a scanning disc 16 is mounted, the latter extending through a slot 17, in the plate.

A neon lamp 18, is mounted in the casing 10, behind the perforations in the scanning disc in the well known manner.

A motor 19, is fixed upon a carriage 20, which is arranged to be moved in a direction parallel to the plane of the disc 16. In the embodiment illustrated, the carriage is arranged to slide upon the top surface of the plate 11, and is provided with bushings 21, fixed thereto and threaded to receive a threaded rod or screw 22, which passes loosely through the upright 12 and is held against axial movement by means of collars 23, fixed thereon. The bushings 21 and the rod 22, are received in an elongated slot 24, in the plate 11. The rod is provided with a knurled thumb wheel 25, for actuating the same.

The armature shaft 26 of the motor 19, is provided with a friction element 27, in the form of a leather or rubber disc, between metal clamping elements, the outer periphery of which disc is adapted to contact a friction disc 28, of suitable material. The disc 28 may be integral with the disc 16, as shown, or it may be separate therefrom and mounted on the same shaft as the disc 16, or it may be geared to the latter in any suitable way. The thrust of the friction element 27, against the disc 16, may be taken up by a spring 29, surrounding the shaft 15, and bearing against a washer 30, abutting against the adjustable nut 31, threaded onto the shaft. The motor is preferably so positioned that its shaft is at an angle to the plane of the scanning disc, so that friction elements 27, of smaller diameter than the motor may be employed.

The carriage 20, is so guided and held in position by means of the bushings 21, which fit closely in the slot 24, and is resiliently held in contact with the plate 11, by means of springs 32, coiled about pins 33, extending downwardly from the bushings 21, the springs acting against washers 34, loose on said pins and engaging the underside of the plate 11, and against washer 35, adjustably positioned on said pins by means of nuts 36.

The operation of my improved apparatus will be clear from the above. Upon rotating the wheel 25, the bushings will be caused to travel along the screw rod 22, so that the friction element 27, will engage the friction disc 28, at different distances from the center of such disc, so that the speed of the latter will be quickly and easily varied to bring it to synchronization with the scanning disc at the sending or broadcasting station.

It is obvious, that various changes and modifications may be made to the details of construction without departing from the general spirit of the invention as set forth in the appended claims.

I claim:—

1. The combination of a scanning disc, a motor having an armature shaft, a friction element on said shaft adapted to engage said disc to drive the same, a carriage for supporting said motor, and means for moving said carriage in a direction parallel to the plane of said disc.

2. The combination of a scanning disc, a motor having an armature shaft, a friction element on said shaft adapted to engage said disc to drive the same, said shaft being positioned at an angle to the plane of said disc, a carriage for supporting said motor, and means for moving said carriage in a direction parallel to the plane of said disc.

3. The combination of a scanning disc, a motor having an armature shaft, a friction element on said shaft adapted to engage said disc to drive the same, a carriage for supporting said motor, and means for moving said carriage in a direction parallel to the plane of said disc, said means including a threaded bushing connected to said carriage, a rotatable screw rod engaging said bushing and means for holding said rod against axial movement.

4. The combination of a scanning disc, a motor having an armature shaft, a friction element on said shaft adapted to engage said disc to drive the same, a carriage for supporting said motor, and means for moving said carriage in a direction parallel to the plane of said disc, said means including a plate for supporting said carriage, a threaded bushing connected to said carriage, a rotatable screw rod engaging said bushing, means for holding said rod against axial movement, and resilient means for urging said carriage toward said plate.

5. The combination of a scanning disc, a motor having an armature shaft, a friction element on said shaft adapted to engage said disc to drive the same, a carriage for supporting said motor, and means for moving said carriage in a direction parallel to the plane of said disc, said means including a plate for supporting said carriage, a threaded bushing connected to said carriage, a rotatable screw rod engaging said bushing, means for holding said rod against axial movement and resilient means, including a pin rigid with said bushing and a spring coiled about said pin and acting against said plate and against an abutment on said pin, for urging said carriage toward said plate.

6. The combination of a scanning disc, a motor having an armature shaft, a friction element on said shaft adapted to engage said disc to drive the same, said element being movable toward and away from the center of said disc, means for so moving said element, and means for absorbing the thrust on said scanning disc whereby continuous contact between said disc and friction element is maintained.

7. The combination of a scanning disc, a friction disc, connected thereto, a motor having an armature shaft, a friction element on said shaft adapted to engage said friction disc to effect rotation of said scanning disc, and means for moving said friction element toward and away from the center of said friction disc to vary the speed of the same.

8. The combination of a scanning disc, a friction disc integral therewith, a motor having an armature shaft, a friction element on said shaft adapted to engage said friction disc to effect rotation of said scanning disc, and means for moving said friction element toward and away from the center of said friction disc to vary the speed of the same.

JOHN GELOSO.